United States Patent
Waters et al.

(10) Patent No.: US 9,292,525 B2
(45) Date of Patent: Mar. 22, 2016

(54) SEARCHING DATA USING PRE-PREPARED SEARCH DATA

(71) Applicants: RESEARCH IN MOTION LIMITED, Waterloo (CA); QNX Software Systems Limited, Kanata (CA)

(72) Inventors: Ryan John Waters, Ottawa (CA); Martello Michealangelo Jones, Ottawa (CA); Sivakumar Nagarajan, Ottawa (CA)

(73) Assignee: BlackBerry Limited; 2236008 Ontario Inc., Waterloo, Ontario (CA)

( * ) Notice: Subject to any disclaimer, the term of this patent is extended or adjusted under 35 U.S.C. 154(b) by 456 days.

(21) Appl. No.: 13/921,587

(22) Filed: Jun. 19, 2013

(65) Prior Publication Data

US 2014/0379695 A1 Dec. 25, 2014

(51) Int. Cl.
G06F 17/30 (2006.01)
H04W 4/00 (2009.01)
H04L 29/08 (2006.01)

(52) U.S. Cl.
CPC ........ *G06F 17/30106* (2013.01); *G06F 17/301* (2013.01); *G06F 17/30864* (2013.01); *H04L 67/20* (2013.01); *H04W 4/003* (2013.01)

(58) Field of Classification Search
CPC ............ G06F 17/30864; G06F 17/301; G06F 17/30115; G06F 17/30106; G06F 17/30126; H04W 4/003; H04L 67/20
See application file for complete search history.

(56) References Cited

U.S. PATENT DOCUMENTS

| 7,904,899 | B2 * | 3/2011 | Robalewski | G06F 9/44505 717/168 |
| 8,904,550 | B2 * | 12/2014 | Bukurak | G06F 21/53 726/27 |
| 2014/0053099 | A1 * | 2/2014 | Groten | G06T 19/006 715/790 |
| 2014/0172840 | A1 * | 6/2014 | Kumar | G06F 17/30867 707/723 |
| 2014/0344456 | A1 * | 11/2014 | Buzbee | G06F 17/30067 709/225 |

OTHER PUBLICATIONS

EPO, Extended European Search Report relating to application No. 13172910.5 dated Sep. 25, 2013.
Legare, J-S et al., "Building Private Applications on the Personal Web", University of British Columbia, Jan. 1, 2012, XP55079213, Vancouver, Canada, Retrieved from the Internet: URL:http://www.cs.ubs.ca/~jslegare/dls/draft_pando_nov_2011.pdf [retrieved on Sep. 13, 2013] *whole document*.

(Continued)

*Primary Examiner* — Cheryl Lewis
(74) *Attorney, Agent, or Firm* — Rowand LLP

(57) ABSTRACT

Methods and devices for searching are described. In one aspect, the method includes: receiving a search query; identifying a search data file associated with a third party application, the search data file being prepared according to pre-determined format rules by the third party application, and stored, prior to receiving the search query; searching, at least a portion of the search data file using the search query to identify information that matches the search query; using the predetermined format rules to identify associated information in the search data file, the associated information being related to the information that matches the search query; obtaining search results from at least one other source; and generating a display of search results based on both the information matching the search query and the associated information, the display including the search results from the at least one other source.

20 Claims, 7 Drawing Sheets

(56) References Cited

OTHER PUBLICATIONS

Gomez-Barroso, J.S. et al., Promising Prospects in Mobile Search: Business As Usual or Techno-Economic Disruptions? [Social Sciences], IEEE Signal Processing Magazine, IEEE Service Centre, Piscataway, NJ, US, vol. 28, No. 4, Jun. 16, 2011, pp. 131-135, XP0011367639, ISSN: 1053-5888, DOI: 10.1109/MSP.2011.941135 *whole document*.

Arias, M. et al., "ContextBased Personalization for Mobile Web Search", VLBD '08, Aug. 30, 2008, XP055077155, Aucland, New Zealand, Retrieved from the Internet: URL:http://persdb08.stanford.edu/5-PersDB-Paper.pdf [retrieved on Aug. 30, 2013] *whole document*.

Yndurain, E. et al., "Augmenting Mobile Search Engines to Leverage Context Awareness", IEEE Internet Computing, IEEE Service Center, New York, NY.—Institute of Electrical and Electronic Engineers, US, vol. 16, No. 2, Jan. 17, 2012, pp. 17-25, XP011428688, ISSN: 1089-7801, DOI: 10.1109/MIC.2012.17 *whole document*.

Feijoo, C. et al., "1 Mobile Search, A Case for Next Generation Information Society Policies", International Telecommunications Society 18th Biennial and Silver Anniversary Conference, Jun. 30, 2010, XP055077152, Tokyo, Retrieved from the Internet: URL:http://oa.upm.es/9385/1/INVE_MEM_2010_87335.pdf [retrieved on Aug. 30, 2013] *whole document*.

* cited by examiner

SEARCHING DATA USING PRE-PREPARED SEARCH DATA

TECHNICAL FIELD

The present application relates to the searching and handling of data on an electronic device and, more particularly, to search methods and devices.

BACKGROUND

Electronic devices are often equipped with one or more third party applications. Such third party applications may, for example, provide added functionality to the electronic device. For example, such third party applications may include web browsers, communication applications such as instant messaging applications, mapping applications, or other applications.

Such applications may have data associated therewith. For example, web browsers may track a browsing history and/or bookmarks, mapping applications may track a history of visited places, etc. Traditionally, such data could be accessed through the application itself. That is, the application could be launched and the data could then be accessed via the application's user interface.

BRIEF DESCRIPTION OF THE DRAWINGS

Reference will now be made, by way of example, to the accompanying drawings which show example embodiments of the present application, and in which.

Like reference numerals are used in the drawings to denote like elements and features.

DETAILED DESCRIPTION

Figure 1:
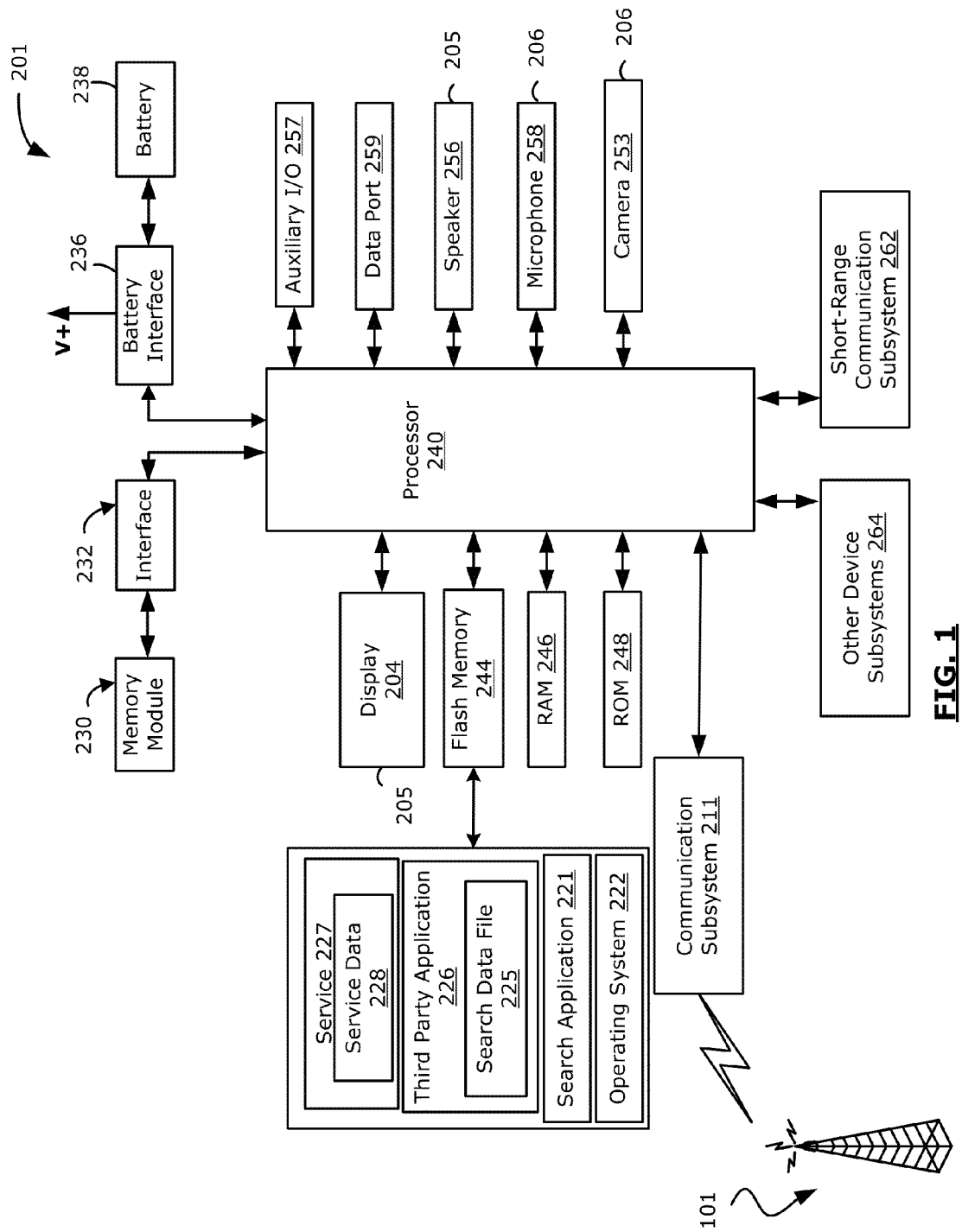
FIG. 1 is a block diagram illustrating an example electronic device in accordance with example embodiments of the present disclosure.

In one example embodiment a processor-implemented method of searching data associated with an electronic device is described. The method includes: receiving a search query at a search application; identifying, by the search application, a search data file associated with a third party application, the search data file being prepared according to predetermined format rules by the third party application, and stored, prior to receiving the search query, at a location of memory at which the search application is configured to scan for the search data file; searching, by the search application, at least a portion of the search data file using the search query to identify information that matches the search query; using the predetermined format rules to identify associated information in the search data file, the associated information being related to the information that matches the search query; obtaining search results from at least one other source; and generating a display of search results based on both the information matching the search query and the associated information, the display including the search results from the at least one other source.

In another example embodiment, an electronic device is described. The electronic device includes a memory storing a search data file associated with a third party application. The search data file is prepared according to predetermined format rules by the third party application. The electronic device further includes a processor coupled with the memory. The processor is associated with a search application which configures the processor to: receive a search query; identify the search data file associated with the third party application; search at least a portion of the search data file using the search query to identify information that matches the search query; use the predetermined format rules to identify associated information in the search data file, the associated information being related to the information that matches the search query; obtain search results from at least one other source; and generate a display of search results based on both the information matching the search query and the associated information, the display including the search results from the at least one other source.

In some example embodiments, a further processor-implemented method searching data associated with an electronic device is described. The method includes: determining whether a first sandbox is locked; if the first sandbox is unlocked, obtaining search results from one or more applications associated with the first sandbox; obtaining search results from one or more applications associated with a second sandbox; and displaying the search results from the applications associated with the first sandbox together with the search results for the applications associated with the second sandbox.

Other example embodiments of the present disclosure will be apparent to those of ordinary skill in the art from a review of the following detailed description in conjunction with the drawings.

Example embodiments of the present disclosure are not limited to any particular operating system, electronic device architecture, server architecture or computer programming language.

Example Electronic Device

Reference is first made to FIG. 1 which illustrates an example electronic device 201. In the illustrated example embodiment, the electronic device 201 is a communication device, such as a mobile communication device. In at least some example embodiments, the electronic device 201 is a two-way communication device having data and voice communication capabilities, and the capability to communicate with other computer systems, for example, via the Internet. Depending on the functionality provided by the electronic device 201, in various example embodiments the electronic device 201 may be a multiple-mode communication device configured for data and voice communication, a mobile telephone such as a smart phone, a tablet computer, an electronic book reader, a wearable computer such as a watch, a PDA (personal digital assistant), or a computer system.

A smartphone is a mobile phone which offers more advanced computing capabilities than a basic non-smartphone cellular phone. For example, a smartphone may have an ability to run third party applications which are stored on the smartphone.

A tablet computer (which may also be referred to as a tablet) is an electronic device 201 which is generally larger than a mobile phone (such as a smartphone) or personal digital assistant. Many mobile phones or personal digital assistants are designed to be pocket sized. That is, mobile phones or personal digital assistants are generally small enough to be carried by a person easily, often in a shirt or pant pocket while tablet computers are larger and may not fit within pant pockets. For example, many tablet computers have a height which is seven inches (7") or more.

In at least some example embodiments, the electronic device 201 is a handheld electronic device. A handheld electronic device is an electronic device 201 which is sufficiently small to be held in one or more hands of a user. The term handheld electronic device includes smartphones and may also include tablet computers. In at least some example embodiments, the handheld electronic device may be sufficiently small to be held in a single hand of a user. For example, the handheld electronic device may be a palm-sized device which is sized to be held in the palm of a user's hand. From the description which follows, it will be appreciated that the techniques and methods described herein may be used in electronic devices 201 having limited display capabilities.

In other example embodiments, the electronic device 201 may be of a type not specifically listed above.

The electronic device 201 includes a housing (not shown) which houses components of the electronic device 201. The internal components of the electronic device 201 are constructed on a printed circuit board (PCB). The electronic device 201 includes a controller including at least one processor 240 (such as a microprocessor) which controls the overall operation of the electronic device 201. The processor 240 interacts with device subsystems, such as a wireless communication subsystem 211 for exchanging radio frequency signals with a wireless network 101 to perform communication functions. The processor 240 interacts with additional device subsystems including one or more input interfaces 206 (such as a keyboard, one or more control buttons, a camera 253, one or more microphones 258, and/or a touch-sensitive overlay associated with a touchscreen display, etc.), flash memory 244, random access memory (RAM) 246, read only memory (ROM) 248, auxiliary input/output (I/O) subsystems 257, a data port 259 (which may be a serial data port, such as a Universal Serial Bus (USB) data port), one or more output interfaces 205 (such as a display 204, one or more speakers 256, or other output interfaces), a short-range communication subsystem 262, and other device subsystems generally designated as 264. Some of the subsystems shown in FIG. 1 perform communication-related functions, whereas other subsystems may provide "resident" or on-device functions.

One or more of the input interfaces 206 may be configured for receiving user input to allow a user to interact with the electronic device 201. Such input interfaces 206 may, for example, allow a user to interact with a graphical user interface provided on the electronic device 201. Instructions, commands, or other forms of input may be received by the electronic device 201 via the input interfaces. For example, the input interfaces 206 may allow a user to interact with one or more interface elements displayed on a graphical user interface of the display 204. The graphical user interface may, in some example embodiments, include a display 900 of the type described below with reference to FIG. 7.

The input interfaces 206 may take a variety of forms. For example, any one or combination of the following input interfaces 206 may be included on the electronic device 201 and used for receiving user input: a touchscreen display, a control button, a trackball, trackpad, or optical input device, a keyboard, a camera 253 (which may be used, for example, to detect gesture-based input), an orientation or acceleration sensor such as an accelerometer (which may be used, for example, to detect gesture-based input performed by moving the electronic device 201), and/or a microphone 258 (which may be used, for example, to detect voice-based commands). It will be appreciated that the foregoing list of input interfaces 206 is not exhaustive and that other input interfaces 206 may be used instead of or in addition to any of the interfaces 206 described above.

As noted previously, the electronic device 201 may include a touch-sensitive display 204 which may be referred to as a touchscreen or a touchscreen display 204. The touchscreen display 204 may be constructed using a touch-sensitive input surface connected to an electronic controller. The touch-sensitive input surface overlays the touchscreen display 204 and may be referred to as a touch-sensitive overlay. The touch-sensitive overlay and the electronic controller provide a touch-sensitive input interface 206 and the processor 240 interacts with the touch-sensitive overlay via the electronic controller. That is, the touchscreen display 204 acts as both an input interface 206 and an output interface 205.

In some example embodiments, the electronic device 201 may communicate with any one of a plurality of fixed transceiver base stations of the wireless network 101 within its geographic coverage area. The electronic device 201 may send and receive communication signals over the wireless network 101 after the required network registration or activation procedures have been completed.

In some example embodiments, the auxiliary input/output (I/O) subsystems 257 may include an external communication link or interface, for example, an Ethernet connection. The electronic device 201 may include other wireless communication interfaces for communicating with other types of wireless networks, for example, a wireless network such as an orthogonal frequency division multiplexed (OFDM) network.

In the example embodiment illustrated, the electronic device 201 also includes a memory module 230 (which may be flash memory) and a memory module interface 232. The memory module 230 may be removable from the electronic device 201. Network access may be associated with a subscriber or user of the electronic device 201 via the memory module 230, which may be a Subscriber Identity Module (SIM) card for use in a GSM network or other type of memory module for use in the relevant wireless network. The memory module 230 may be inserted in or connected to the memory module interface 232 of the electronic device 201.

The electronic device 201 may store data in an erasable persistent memory, which in one example embodiment is the flash memory 244. In various example embodiments, the data may include service data having information required by the electronic device 201 to establish and maintain communication with the wireless network 101. The data may include a search data file 225. The search data file 225 will be discussed in greater detail below. The data may also include service data 228. Service data is data that is associated with a service 227 and will be discussed in greater detail below during the discussion of the service 227.

The data port 259 may be used for synchronization with a user's host computer system (not shown). The data port 259 enables a user to set preferences through an external device or software application and extends the capabilities of the electronic device 201 by providing for information or software downloads to the electronic device 201 other than through the wireless network 101. The alternate download path may, for example, be used to load an encryption key onto the electronic device 201 through a direct, reliable and trusted connection to thereby provide secure device communication.

In some example embodiments, the electronic device 201 is provided with a service routing application programming interface (API) which provides an application with the ability to route traffic through a serial data (i.e., USB) or Bluetooth® (Bluetooth® is a registered trademark of Bluetooth SIG, Inc.) connection to the host computer system using standard connectivity protocols. When a user connects their electronic device 201 to the host computer system via a USB cable or Bluetooth® connection, traffic that was destined for the wireless network 101 is automatically routed to the electronic device 201 using the USB cable or Bluetooth® connection. Similarly, any traffic destined for the wireless network 101 is automatically sent over the USB cable Bluetooth® connection to the host computer system for processing.

The electronic device 201 includes or is connectable to a power source. In the example embodiment illustrated, the power source is a battery 238, such as a rechargeable battery that may be charged, for example, through charging circuitry coupled to a battery interface 236 such as the serial data port 259. The battery 238 provides electrical power to at least some of the electrical circuitry in the electronic device 201, and the battery interface 236 provides a mechanical and electrical connection for the battery 238. The battery interface 236 is coupled to a regulator (not shown) which provides power V+ to the circuitry of the electronic device 201.

The short-range communication subsystem 262 is an additional optional component which provides for communication between the electronic device 201 and different systems or devices, which need not necessarily be similar devices. For example, the short-range communication subsystem 262 may include an infrared device and associated circuits and components, or a wireless bus protocol compliant communication mechanism such as a Bluetooth® communication module to provide for communication with similarly-enabled systems and devices.

A pre-determined set of applications that controls basic device operations, including data and possibly voice communication applications, may be installed on the electronic device 201 during or after manufacture. Additional applications and/or upgrades to an operating system 222 or software applications may also be loaded onto the electronic device 201 through the wireless network 101, the auxiliary I/O subsystem 257, the data port 259, the short-range communication subsystem 262, or other suitable device subsystems 264. The downloaded programs or code modules may be permanently installed, for example, written into the program memory (i.e. the flash memory 244), or written into and executed from the RAM 246 for execution by the processor 240 at runtime.

In some example embodiments, the electronic device 201 may provide two principal modes of communication: a data communication mode and a voice communication mode. In the data communication mode, a received data signal such as a text message, an email message, or a web page download will be processed by the communication subsystem 211 and input to the processor 240 for further processing. For example, a downloaded web page may be further processed by a browser application or an email message may be processed by the email messaging application and output to the touchscreen display 204. A user of the electronic device 201 may also compose data items, such as email messages, for example, using the input interfaces 206, such as the touchscreen display 204. These composed items may be transmitted through the communication subsystem 211 over the wireless network 101.

In the voice communication mode, the electronic device 201 provides telephony functions and operates as a typical cellular phone. The overall operation is similar to the data communication mode, except that the received signals would be output to the speaker 256 and signals for transmission would be generated by a transducer such as the microphone 258. The telephony functions are provided by a combination of software/firmware (i.e., a voice communication module) and hardware (i.e., the microphone 258, the speaker 256 and input interfaces). Alternative voice or audio I/O subsystems, such as a voice message recording subsystem, may also be implemented on the electronic device 201. Although voice or audio signal output is typically accomplished primarily through the speaker 256, the touchscreen display 204 may also be used to provide an indication of the identity of a calling party, duration of a voice call, or other voice call related information.

The processor 240 operates under stored program control and executes software modules stored in memory such as persistent memory, for example, in the flash memory 244. As illustrated in FIG. 1, the software modules include operating system software 222 and software applications, such as a search application 221 and a third party application 226.

The search application 221 is configured to receive a search query from a user and, in response, to perform a search of data associated with the electronic device 201. More particularly, the search application 221 may be configured to receive one or more characters (which may be alphanumeric characters or symbols commonly associated with a keyboard, such as a QWERTY keyboard) representing a search query and to use those characters as part of a search. That is, the search application determines whether data on memory of the electronic device 201 matches the search query (e.g. the input characters).

In some example embodiments, the search application 221 may provide as-you-type search results. That is, the search application 221 may be configured to perform a search following each character input and/or when there is a brief pause in the input of characters. That is, in at least some example embodiments, a carriage return or other input (such as clicking on a button labeled search, or an equivalent button) is not required in order to input a search query; the input of an additional character or a pause in the input of characters is treated as an instruction to perform a search and a search is performed based on the inputted characters (even if the input is not yet complete).

The search application 221 is universal in that it is configured to search data associated with multiple sources. For example, the search application 221 may search data associated with the operating system 222, data associated with a third party application 226 (i.e. by searching a search data file 225 associated with that application), data associated with a service 227 (i.e. service data 228), and/or other data such as data associated with other applications or services.

As will be described in greater detail below (e.g. with reference to FIG. 7), the search application 221 may be configured to generate a display (e.g. on the display 204) which includes search results from a plurality of sources. For example, search results from a third party application 226 may be displayed together with search results from other applications or services 227.

Accordingly, the search application 221 may search within data that is owned by a third party application 226. The third party applications 226 that may be searched by the search application 221 may include any one of a number of various application types including, for example, a web browser, a mapping application, a communication application (such as an email application, an instant messaging application, etc.), a social media application (such as an application for interacting with a social network, such as Facebook™, Linkedin™, etc.). The third party application 226 may be of another type in other example embodiments.

The third party application 226 may be any application apart from the operating system 222 and apart from the search application 221. The term "third party" is meant to indicate that the application is separate and distinct from the search application 221 and, in at least some example embodiments, separate and distinct from the operating system 222. That is, the search application 221 is not provided within the operating system itself and is an application that may be added to the electronic device 201 after installation of the operating system and removed from the electronic device 201 without removing either the operating system or the search application 221. The third party application may be provided by a developer apart from the developer of the operating system and/or the search application 221. However, in some example embodiments, the third party application 226 may be produced by the developer of the search application and/or the operating system 222. The third party application may be referred to as a value-added application in some example embodiments.

The third party application 226 may have its own data that is accessed by the third party application but which, in at least some example embodiments, is not shared with other applications. That is, the third party application 226 has access to the data but other third party applications (or services 227) do not have access to that data. In order to allow the search application 221 to include this data in the search, the third party application 226 specially prepares a search data file 225. This file is prepared in advance of a search being performed (i.e. it is prepared before the search query is received) and is retrieved by the search application 221 in order to provide search results associated with the third party application 226. The search data file 225 is prepared using predetermined format rules that are known to the search application 221. That is, the search application 221 is able to read and interpret the search data file 225.

The predetermined format rules may allow the third party application 226 to designate at least some of the data within the search data file 225 as searchable and some data within the search data file 225 as not searchable. The search application searches only within the searchable portion of the file and excludes the non-searchable portion from the search. As will be described in greater detail below, in at least some example embodiments, the non-searchable portion includes metadata that may be used by the search application 221 when rendering, grouping and/or sorting search results. For example, the metadata may define the order by which search results will be presented. That is, the search application 221 may consult the metadata to determine how to order the search results.

The operating system 222 may be configured such that the search data file 225 may be a protected file. More particularly, at least some applications on the electronic device 201 may be denied certain access privileges for the search data file 225. In at least some example embodiments, the third party application 226 which owns the file (i.e. the third party application which creates the search data file 225 and/or inserts data into the search data file 225), is granted both read and write privileges to the search data file 225. That is, the third party application 226 is permitted to both read data from the file and write data to the file. The search application 221 may be permitted (by the operating system 222) to read from the search data file 225, but may be prohibited from writing to the search data file 225. That is, the search application 221 has read-only access to the search data file 225.

In contrast, other applications (i.e. apart from the third party application 226 and the search application 221) may not be permitted to read or write to the search data file 225. For example, another third party application may be prevented from reading from the search data file 225 and/or writing to the search data file 225. In some example embodiments, only the third party application 226 that owns the search data file 225 (i.e. the third party application 226 which generates the data for the file) and the search application 221 are permitted to read from the file; other applications may be prohibited from reading from the search data file 225.

Thus, the search data file 225 may be specially configured so that the search application 221 is permitted to read the contents of the file in order to provide search results but other applications (apart from the third party application 226 that stores data in the search data file 225) are prohibited from snooping within the file (i.e. they cannot read the contents of the file because the operating system 222 does not grant them read privileges).

Accordingly, each search data file 225 is associated with a particular application and provides search results for that application. The data within the search data file 225 is preconfigured. That is, the data is stored within the file before the search query is received (i.e. the file is not generated in response to receiving a search query—if the third party application 226 has data that it wishes to share with the search application, the file is preconfigured before the search query is received).

While the search data file 225 is illustrated as being a single file, in some example embodiments, the contents of the search data file 225 may be split into multiple files. For example, a first file may store searchable data and a second file may store non-searchable data, such as metadata (i.e. data that is not searchable but that relates to the searchable data).

Accordingly, the search data file 225 is prepared by the third party application. The search data file 225 may, in at least some example embodiments, be stored in a storage area (such as a folder) associated with the third party application 226 (i.e. the application which stores data in the search data file 225). In at least some example embodiments, the access privileges discussed above may be enforced with respect to the storage area. That is, the operating system 222 may be configured such that only the third party application 226 is permitted to write to any files stored within that storage area (e.g. within that folder), and the third party application 226 and the search application 221 are permitted to read from files stored within that storage area, while other applications are not permitted to read or write to files stored in that storage area.

While a single third party application 226 is illustrated in FIG. 1, in practice the memory may contain a plurality of third party applications. A number of those third party applications may generate their own search data files 225, all prepared in a common format. That is, a plurality of third party applications may all abide by the same predetermined formatting rules that are known to the search application 221. By utilizing these formatting rules, the third party applications can generate data for a search using any data associated with those applications that a user may wish to search and may then allow such data to be searched via the search application 221. That is, by storing the data in the search data file 225 using the predetermined format rules, the search application 221 may then use its own knowledge of the predetermined format rules to search relevant parts of the search data file 225 to generate search results.

In at least some example embodiments, one or more services 227 may also be provided in memory of the electronic device 201. Like the third party application 226, the service 227 is a software module that may be stored in memory of the electronic device 201. The service, however, differs from an application in that the service 227 is generally configured to run as a background process on the electronic device 201. More particularly, applications typically require some user input (such as selecting an icon associated with the application from a home or start page) in order to cause them to run on the electronic device 201. When the application starts up, it is typically accompanied by an associated graphical user interface and the graphical user interface may remain active while the application runs. In contrast, a service 227 may run without a graphical user interface and/or may not require user input in order to run. The service 227 may be automatically initiated; for example, when the electronic device 201 first boots up.

By way of example, in some example embodiments, email may be associated with an email service. The email service may, for example, run in the background and may monitor for emails sent to the electronic device 201 and trigger a notification (such as an audible, visual or vibratory alarm) upon receipt of an email.

At least some services may be associated with applications. For example, the email service (which monitors for emails and may trigger a notification upon receipt of an email) may be associated with an email application (which may provide a graphical user interface for accessing emails, for example). Thus, the services and applications may be complementary on the electronic device 201.

In at least some example embodiments, services 227 may also have data associated therewith. Such data may be referred to as service data 228. In some example embodiments, the service data 228 associated with a service 227 may also be searched when a search query is received in the search application 221. However, in at least some example embodiments, the data associated with services may be searched in a different way than the data associated with applications. As noted above, for applications, search data may be pre-prepared (as a search data file 225) for the search application 221 by the third party application 226 and then searched by the search application upon receipt of a search query. This method allows the data of the application to be searched without having to run the application. In contrast, since the service 227 may already running, the search application 221 may provide the search query to the service 227 and may allow the service 227 to perform the searching of the service data 228 associated with that service 227. The service 227 may then return search results to the search application 221 in a predetermined format. Then, the search application 221 may render the search results received from the service 227 together with the search results obtained by searching the search data file 225.

In rendering the search results, the search application 221 may allow one or more of the search results to be invoked. For example, a search results may be activated to cause the third party application 226 associated with that search result to be opened and the specific search result to be accessed from within the third party application 226. For example, if the search result is a record (such as an email, etc.), the record may be opened when the search result is activated.

As will be discussed in greater detail below, in at least some example embodiments, the third party application 226 may be permitted to control how a search result is to be accessed when it is activated. More particularly, a third party application 226 may pass a Uniform Resource Locator (URI) to the search application 221 via the search data file 225, which may be used to invoke a particular search result. In at least some example embodiments, if no URI is provided by the third party application 226 and a search result is activated, then the third party application associated with that search result may be invoked. An application switch may be used when the third party application 226 is invoked which directs the third party application 226 to open a specific record. For example, a record identifier associated with the search result which was activated may be used to inform the third party application 226 of the record that is to be opened.

While the search application 221 may, in some example embodiments, be logically divided into multiple components. For example, in some example embodiments, the search application 221 may include both an application and a service (which may be referred to as a search service). For example, the application portion of the search application 221 may provide the graphical user interface features of the search application (e.g. it may allow a user to input a search query and may display search results). The application may interact with the service, which performs the searching functions described herein. This structure may allow other applications to utilize the service associated with the search application 221 to perform search queries. Thus, in at least some example embodiments, features described herein as being performed by the "search application" may be performed by a search service. Thus, the search application may be a search service in some example embodiments.

Software modules associated with the electronic device 201 (such as the third party application 226 and/or the service 227) or parts thereof may be temporarily loaded into volatile memory such as the RAM 246. The RAM 246 is used for storing runtime data variables and other types of data or information. Although specific functions are described for various types of memory, this is merely one example, and a different assignment of functions to types of memory could also be used.

Example Search Data File

As noted in the discussion of FIG. 1 above, one or more applications (which may be referred to as third party applications 226) associated with the electronic device 201 may pre-prepare data which may be used by the search application 221 for performing a search. More particularly, the data may be stored, by the third party application 226, as a search data file 225. The search data file 225 effectively acts as a database of possible search results for a specific application and may therefore be referred to as a search results database and/or an application-specific search results database. An example search data file 225 will now be described.

As noted above, the search data file 225 is prepared in a predetermined format by the third party application 226 associated with the data contained in the search data file 225. That is, the search data file is prepared by a third party application 226 according to one or more predetermined format rules. The format rules used by the third party application 226 are known to the search application 221, thus allowing the search application 221 to read and properly interpret the data contained in the search data file 225.

The predetermined format rules allow for the creation of an association between related data. For example, the predetermined format rules may allow for the creation of records. Each record may be comprised of related information. For example, a record may have a plurality of fields and the fields may include data that is related.

In the example illustrated, the search data file includes data in a table. In the example, all of the data is illustrated using an X character, but it will be appreciated that the data will differ. The rows 140a, 140b, 140c, 140d of the table(s) are used to establish records. That is, all data in a given row is associated with a different record. In the example illustrated, the columns 142a, 142b, 142c, 142b, 144a, 144b, 144c are used to denote different fields. That is, each column 142a, 142b, 142c, 142d, 144a, 144b, 144c represents information of a specific type.

By way of example, if the search data file 225 was associated with a web browser application, each row may represent a separate browsing history entry. By way of further example, a first column 142a might represent a uniform resource locator (URL), a second column 142b might represent a date when the URL was last visited, a third column 142c might represent a page title associated with the URL, and a fourth column 142d might represent a time of day when the URL was last visited. The columns 144a, 144b, 144c of the non-searchable data table 132 may represent metadata related to the browsing history entries that may be used to allow the web browser application to control how the search application 221 displays search results related to the web browser application.

It will be appreciated that the role of the rows and columns may be reversed in some example embodiments. That is, in some example embodiments, the rows 140a, 140b, 140c, 140d are used to indicate different fields (i.e. data of different types) and the column 142a, 142b, 142c, 142d, 144a, 144b, 144c are used to establish records. For example, all data in a column may be associated with a common record, but the differing rows may indicate differing types of data (i.e. different fields).

In the example illustrated, the search data file 225 includes two separate portions and, more particularly, two separate tables. A first portion of the search data file 225 (which is referred to as a searchable data table 130 or a first table) is configured to be searchable and a second portion of the search data file 225 (which is referred to as a non-searchable data table 132 or a second table) is configured such that it is not searchable. More particularly, the search application 221 is configured to search the first portion of the search data file 225 but not the second portion of the file; the second portion of the file is excluded from the search.

In the example illustrated, the portion of the search data file 225 that is searched is referred to as a searchable data table 130 and the portion that is not searched is referred to as a non-searchable data table 132. While the search application 221 does not perform a search of the non-searchable data table 132 when a search query is received, the non-searchable data table 132 is, nevertheless, used by the search application 221. More particularly, the non-searchable data table 132 includes metadata regarding the data in the searchable data table 130. This metadata is prepared by the third party application 226 and is used by the search application to determine the manner by which search results obtained from the searchable data table 130 are to be displayed. More particularly, the metadata may be used for rendering, grouping or sorting of the search results.

Both portions of the search data file 225 (i.e. the searchable portion and the unsearchable portion) may be related to one another. More particularly, data of the first table may be related with specific metadata in the second table by row number or column number. For example, in some example embodiments, the data in the first row of the searchable data table 130 is related with the data in the second row of the non-searchable data table 132. It will be appreciated that columns could be used to establish this relationship in other example embodiments.

The metadata of the non-searchable data table 132 may take different forms in different example embodiments. By way of example, in some example embodiments, the metadata may specify an image path. The image path may be the path of an icon that is to be displayed when a search query matches a field of a particular record. By way of further example, in some example embodiments, an unbound uniform resource identifier (URI) may be specified in the metadata. The URI may be used to invoke a given search result. That is, the URI may be used to open the search result in the third party application 226.

By way of further example, in at least some example embodiments, the metadata may be used to group or order search results. For example, metadata may assign records to one of a plurality of different groups. Multiple records may, in some example embodiments, be assigned to a common group. This group information may be used by the search application 221 when rendering search results. For example, in some example embodiments, when multiple records of a common group include content that corresponds to the search query, those records may be displayed together in a common group. Alternatively, in some example embodiments, when multiple records of a common group include content that corresponds to the search query, only a single one of those records may be displayed (e.g. the most current one of the records may be displayed, but older records of the same group may not be displayed).

Similarly, metadata may establish the relative priority of records. When the search application 221 displays search results which identify a plurality of records, the search results may be displayed in an order that is determined by the metadata specifying the relative priorities. Thus, while the search application 221 may render the search results, the third party application 226 may control the manner by which those search results are displayed.

Multiple third party application may be configured to generate search data files 225 according to the format defined above. The manner by which records are defined and fields are defined and the manner by which searchable data and non-searchable data are separated may be the same for all such third party applications (i.e. all third party applications that wish to be included in the search results for the search application 221 may prepare a search data file 225 using these same format rules). That is, the search data files 225 generated by a plurality of these third party applications may follow the same predetermined format rules, which are rules that are known to the search application 221.

The predetermined format rules that are known to the search application 221 may not specify the type of searchable data in the search data file 225. That is, the search application 221, in at least some example embodiments, does not know the nature of any of the information in the searchable data table 130; it simply knows the relationships between data in the table (i.e. whether two pieces of data are of a common type or are related in the sense that they belong to a common record). By way of further clarification, the first column in the searchable data table 130 for one search data file 225 (associated with a first third party application 226) may contain different data than is contained in the first column of the searchable data table 130 for another search data file 225 (e.g. associated with a second third party application 226). The third party applications are permitted to include any data that they would like to be searchable within the searchable data table 130 (subject, perhaps, to some size constraints).

However, in at least some example embodiments, the non-searchable data table 132 allows a limited number of predetermined types of metadata to be specified and, in at least some example embodiments, the predetermined rules require that a particular type of metadata be provided at a particular location of the non-searchable data table 132. For example, a particular column (or row, as the case may be) may be used, for all non-searchable data tables 132 in all search data files 225 to specify metadata of a particular type. By way of example, in some example embodiments a first column 144a may be used to specify a location of an image, a second column 144b may specify a URI that may be used to invoke a search result, and a third column 144c may be used to specify a relative priority of a record. Since the non-searchable data is used to effectively pass commands to the search application (e.g. to allow the third party application to tell the search application 221 how to group, sort and/or otherwise render search results for the third party application), the search application 221 may be configured to treat data stored at a certain location (e.g. in a particular column of the non-searchable data table 132) of the non-searchable data table 130 as a particular type of data.

Accordingly, the predetermined rules discussed above are used by the third party application 226 when creating the search data file 225 and are also used by the search application 221 when interpreting the search data files.

Search of Third Party Application Data

Figure 3:
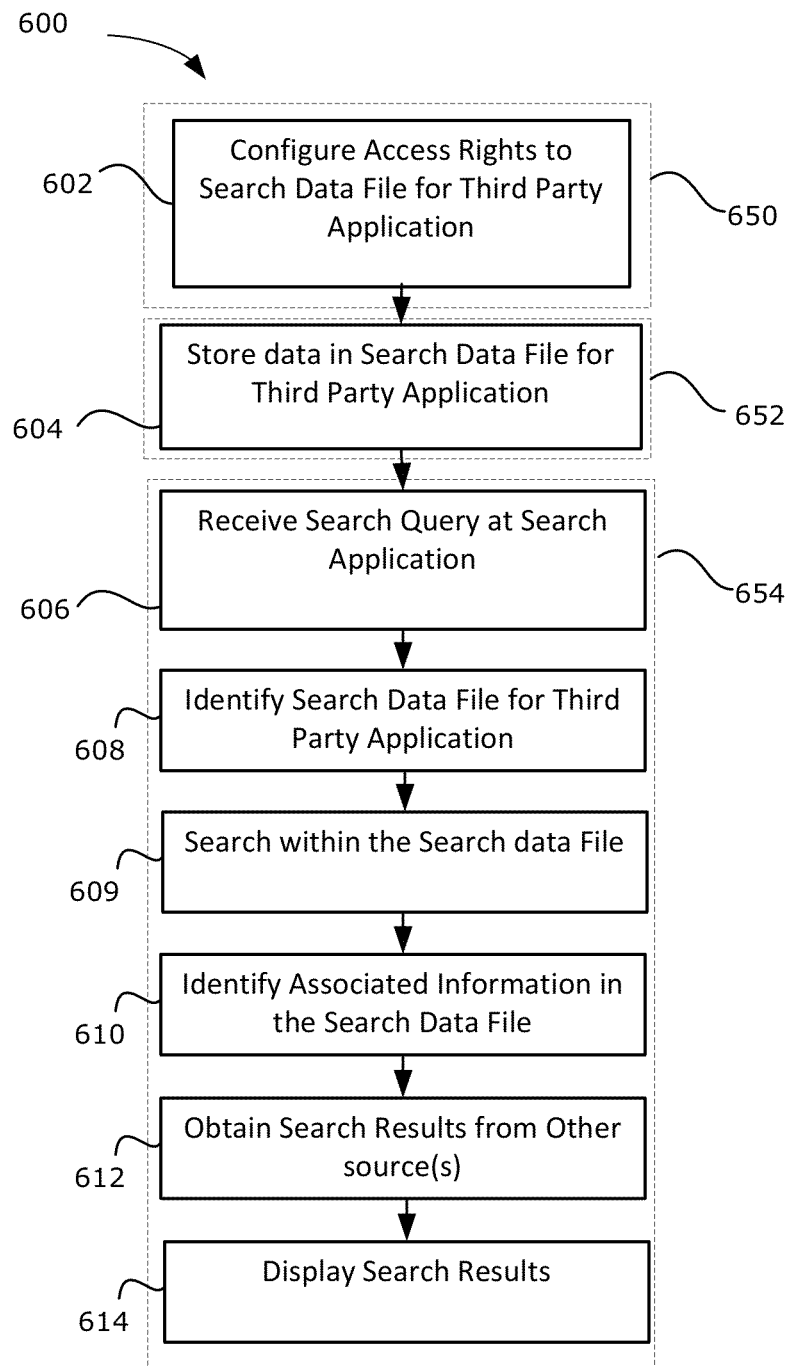
FIG. 3 is a flowchart of an example method for searching data in accordance with example embodiments of the present disclosure.

Referring now to FIG. 3, a flowchart of an example method 600 for providing searching of data will now be discussed. The example method 600 may be performed by the electronic device 201 of FIG. 1 (and/or by the example electronic device 201 of FIG. 5). More particularly, the processor 240 of the electronic device 201 may be configured to perform the method 600. A memory associated with the processor 240 may include processor-executable instructions which, when executed, cause the processor 240 to perform the method 600 of FIG. 3. In at least some example embodiments, these processor-executable instructions are provided in one or more of the software modules described above with reference to FIG. 1. For example, a third party application 226, a search application 221 and/or an operating system 222 associated with the electronic device 201 may configure the electronic device 201 to perform the method 600. Since a plurality of different software components may cause the method 600 to be performed, the method 600 may be comprised of a plurality of sub-methods each performed by a different software component.

For example, a portion 650 of the method 600 may be performed by the operating system 222. That is, the operating system 222 may be configured to cause the processor 240 to perform a portion 650 of the method 600. The portion 650 of the method 600 that is performed by the operating system 222 may, itself, be considered a method.

Similarly, a portion 652 of the method 600 may be performed by the third party application 226. That is, the third party application 226 may be configured to cause the processor 240 to perform a portion 652 of the method 600. This portion 652 may also be considered a method.

Similarly, a portion 654 of the method 600 may be performed by the search application 221. That is, the search application 221 may be configured to cause the processor 240 to perform a portion 654 of the method 600. This portion 654 may also be considered a method.

Thus, FIG. 3 describes a plurality of methods that may be performed. A method is described that may be provided by an operating system 222 (i.e. the portion 650 of the method 600), a method is described that may be provided by a third party application 226 (i.e. the portion 652 of the method 600), and a method is described that may be provided by a search application 221 (i.e. the portion 654 of the method). Additionally, a method 600 may be jointly performed by the operating system 222, the search application 221 and the third party application 226, or by other software applications or modules.

At 602, the operating system 222 configures access rights for a search data file 225 (FIGS. 1 and 2) associated with the third party application 226. The configuration performed at 602 may, in some example embodiments, be performed when the third party application 226 is installed on the electronic device 201. In other example embodiments, the configuration performed at 602 may be performed when an application is first run. That is, the first time an application is launched on the electronic device 201, the configuration may be performed.

In at least some example embodiments, at 602, specific access rights are assigned to a file and/or folder. That is, access rights may be assigned, by the operating system 222 to the search data file 225 and/or to the folder (or other storage area) which contains (or which will eventually contain) the search data file 225. In at least some example embodiments, these access rights prevent at least some other applications (apart from the third party application) from accessing the search data file 225. In some example embodiments, at 602, the search application 221 is granted read-only privileges to the search data file 225. Since the search data file 225 may not yet exist, such read-only privileges may be granted to the search application 221 by granting the search application 221 read-only access to the folder (or other storage area) within which the search data file 225 will be stored. The access rights to a folder may determine the access rights to the files contained within that folder. Read-only access means that the search application 221 may read from the search data file 225 but may not write to the file.

In some example embodiments, at 602, the third party application 226 is granted read and write privileges for the search data file 225. That is, the third party application 226 is permitted to both read from the search data file 225 and to write to the search data file 225. As noted above, since the search data file 225 may not yet be created when 602 is performed, these rights may be assigned to the folder (or other storage area) within which the search data file 225 will be stored.

In some example embodiments, at 602, the operating system may configure the access rights to the search data file 225 (and/or to the folder or other storage area where it is to be stored) to prohibit other applications (apart from the third party application 226 and the search application 221) from reading from the search data file 225 and/or writing to the search data file 225. In at least some example embodiments, all other applications (apart from the third party application 226 and the search application 221) are prohibited from reading from or writing to the search data file 225. That is, the search data file 225 is configured so that it may be used by the search application 221 and the third party application 226 but may not be used by other applications. This allows the third party application 226 to share data with the search application without compromising the security of the data.

The search data file 225 is stored at a location of memory of the electronic device 201 at which the search application 221 is configured to scan for a search data file 225. In at least some example embodiments, the search data file 225 may be stored at a folder that has a predetermined relative path. This relative path may be the same for a plurality of third party applications, but the absolute path may differ. That is, all applications that are using a search data file 225 to pass data to the search application 221 may store the data in a location that has a common relative path. For example, it may be stored at a common path relative to the main folder of the third party application which stores it. For example, each application may have its own main folder or storage location which may be unique for the application. However, the search data file 225 for each application may be stored in a common location relative to that main folder; for example, in a sharewith/search sub-folder named search_data or named using another common name.

By using relative paths that are predetermined and that are common for a plurality of applications, the operating system 222, the search application 221 and the third party application 226 may be able to coordinate in order to allow search data (i.e. the search data file 225) to be shared with the search application 221, but not with other applications. More particularly, since the location at which the search data file 225 will be stored is predictable to the operating system 222, the operating system 222 may identify the proper location at which the search data file 225 is stored (or will be stored) and may use this information to grant access rights (at 602) in the manner discussed above.

At 604, the third party application 226 may store data in the search data file 225. The search data file 225 may be prepared in the format described above with reference to FIG. 2 and may be stored in the location described above (e.g. at a location having a predetermined relative path). More particularly, the search data file 225 is prepared according to one or more predetermined format rules by the third party application 226. These predetermined format rules are recognized by the search application 221 so that the data stored by the third party application may be properly interpreted by the search application.

As noted above, in some example embodiments, the predetermined format rules allow a record having a plurality of fields to be established within the search data file. That is, the predetermined format rules may allow the third party application 226 to create a link between data which are related but which may be of different types. As noted in the discussion of FIG. 2 above, in at least some example embodiments, the predetermined format rules that are used by the third party application 226 (to store data) and the search application 221 (to read data) utilize a table-based structure in order to create relationships between data. That is, data may be included in a table within the search data file 225. The rows (or columns) of the table may be used to establish records. For example, where rows are used to establish records, all data in a given row may be associated with a common record and different columns may denote different fields.

As also noted above in the discussion of FIG. 2, the predetermined rules may allow the third party application 226 to store both searchable data (i.e. data that will be searched by the search application 221) and non-searchable data (i.e. data that will not be searched by the search application 221). That is, a first portion of the search data file 225 may be searchable, while a second portion of the search data file 225 may be configured to be excluded from a search. The second portion of the search data file may store metadata regarding the first portion of the search data file. The metadata may include rendering and/or launching information which will be used by the search application 221 when rendering search results and/or when invoking a search result.

The searchable data may be any data that a user may wish to search. More particularly, application data associated with the third party application 226 is included in the searchable data. This application data is data that is associated with a specific application. It may be data that is generated within or by the third party application 226 or that is otherwise input to the third party application.

The predetermined format rules that are used by the third party application 226 to store data (and used by the search application 221 to read data) may allow specific metadata to be associated with a specific record. That is, an association may be provided between specific metadata in the second portion of the search data file (i.e. the non-searchable portion) and specific data in the first portion of the search data file (i.e. the searchable portion). For example, a location of an image that will be displayed when a particular record matches a search query may be provided. Other example types of metadata are described with reference to FIG. 2.

Figure 2:
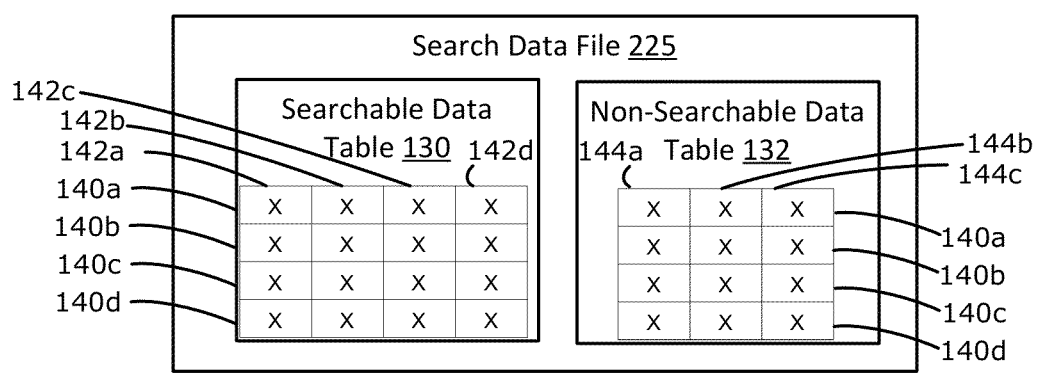
FIG. 2 illustrates a block diagram of an example search data file in accordance with example embodiments of the present disclosure.

As noted in the discussion of FIG. 2, the searchable data and the non-searchable data may be stored in separate tables. For example, in some example embodiments, at 604, searchable data (data that the third party application 226 would like the search application 221 to perform a search with) is stored in a searchable data table 130 while non-searchable data (data that the third party application 226 would not like the search application 221 to perform a search with) may be stored in a non-searchable data table 132. The non-searchable data table may, in at least some example embodiments, store metadata of the type described above. In at least some example embodiments, data of the searchable data table 130 may be related with metadata in the non-searchable data table 132 by row number or by column number.

Thus, at 604, searchable data and, in at least some example embodiments, non-searchable data (such as metadata) may be stored according to the predetermined rules described above and, in at least some example embodiments, in the format described above with reference to FIG. 2.

The search data file 225 may be stored (at 604) in a file that follows a naming convention and/or uses a file extension that is known to the search application 221. That is, all third party applications which generate a search data file 225 may utilize a common naming convention for the file and/or may use a common extension for the file. As will be described below with reference to 608, such conventions may be useful for the search application 221 to identify the search data file 225.

At 606, a search query is received at the search application 221. The search query may be received via a user interface associated with the search application 221 and may rely on an input interface associated with the electronic device 201 for input of the search query. For example, a physical or virtual keyboard may be used to input the search query.

As noted above, in some example embodiments, as-you-type search queries may be supported. That is, a search query may be considered to have been received after a character for the search query has been input and/or after there has been a pause following the input of a character. In some example embodiments, a user may not need activate a search button (or a carriage return) following input of the character(s) in order to perform the search. In other example embodiments, as-you-type searching may not be supported and the search query may be considered to be received only after a specific instruction is received to initiate the search (e.g. after the user has activated a search button).

After the search query is received, the search application 221 performs one or more searches based on the search query. More particularly, in at least some example embodiments, at 608, after the search query is received, the search application 221 identifies the search data file associated with the third party application 226. As noted above, in at least some example embodiments, the search application 221 may (at 608) locate a folder containing the search data file by utilizing a predetermined relative path that is the same for a plurality of third party applications. More particularly, as noted above, each third party application which stores data in a search data file 225 to pass information to the search application 221 may store that file using a common relative path. That is, the relative path used by each application to store the data may be the same, but the absolute path may differ for different applications. The search application 221 is configured with information identifying the relative path and may, at 608, use the relative path information to identify the location at which the third party application may store the search data file 225. This technique may be used to identify a plurality of locations where a plurality of third party applications may store their respective search data files.

As also noted above, in some example embodiments, the search data file 225 may be stored (at 604) in a file that follows a naming convention and/or uses a file extension that is known to the search application 221. This naming convention information and/or file extension information may also be used (at 608) by the search application to identify the search data file 225 for a third party application 226.

When a search data file 225 is located, the search application 221 may search within the search data file 225. More particularly, the search application 221 may search at least a portion of the search data file using the search query to identify information that matches the search query.

Since the search data file 225 was stored prior to receiving the search query (i.e. prior to 606), the search data file 225 may be searched (at 609) by the search application 221. More particularly, the third party application 226 need not be invoked in order to perform the search. If the third party application 226 is not already running, it may remain in a state in which it is not running That is, the search application 221 may perform the search using the search data file without requiring assistance from the third party application 226. The third party application may not run during the period of time between when the search query is received (at 606) and the period of time when search results are subsequently displayed (which will be discussed below with reference to 614), and yet search results may be generated based on application data for that third party application.

The search application 221 is configured to use the same predetermined format rules that were used to create the search data file 225 when searching the search data file 225 and interpreting the results of the search. For example, as noted above, the predetermined format rules may define a searchable portion of the search data file 225 (e.g. a searchable data table 130) and a non-searchable portion of the search data file 225 (e.g. a non-searchable data table 132). When performing the search at 609, the search application 221 performs the search on the searchable portion of the file, but excludes from the search, the non-searchable portion of the file.

Thus, at 609, the search application 221 identifies one or more fields whose contents match the search query. It will be appreciated that, in at least some example embodiments, for the contents to be considered to "match" the search query, only a portion of the contents of the field may be required to match a search query. By way of example, if a search query is "hello" and a field contains data including "hello how are you today", then the contents of the field may be considered to match the search query. It will be appreciated that special search characters or commands may be used in some example embodiments to influence the search algorithm (i.e. to influence what may be considered a "match"). For example, quotations may be used to search a phrase, binary search commands (such as AND, &, OR) may be supported in some example embodiments, and wildcard searching (e.g. using a * or other wildcard character) may be supported in some example embodiments. Other special search commands may also be used in some example embodiments.

As noted in the discussion of FIG. 2 above, the predetermined format rules that are used to create the search data file 225 may allow an association between related data to be created. For example, a single record may be associated with multiple fields, each containing information of a different type. Similarly, specific searchable data may be associated with corresponding non-searchable data (such as metadata).

Thus, in at least some example embodiments, at 610 the predetermined format rules may be used to identify associated information in the search data file. The associated information is information that is related to the information that matches the search query (i.e. the information identified at 609). The associated information may include information that does not, itself, match the search query, but which is associated with information that matches the search query. Similarly, the associated information may include information that was not searched since it was included in the non-searchable portion of the search data file 225 (e.g. the non-searchable data table 132), but which is related to a record containing information that matched the search query.

For example, in some example embodiments, the information matching the search query (i.e. the information identified at 609) is contained in a first field of a record. In some such example embodiments, at 610, the associated information may be another field of the same record. That is, at 610 the search application may identify a second field in the record that includes the first field. The second field may not, itself, correspond to the search query. However, the second field may be used when the search results are displayed (which will be discussed below with reference to 614). More particularly, a display of the search results may include both the contents of the first field and the contents of other fields of the same record, such as the second field.

Similarly, in some example embodiments, the associated information which is identified at 610 may include metadata provided in the non-searchable portion of the search data file 225 (e.g. the non-searchable data table 132). That is, at 610 the search application may retrieve the specific metadata that is associated with the information in the search data file 225 that matches the search query (i.e. the information identified at 609). For example, metadata associated with a record containing a field that matched the search query may be identified.

At 612, in at least some example embodiments, the search application obtains search results from at least one other source. The at least one other source may include other third party applications (e.g. by following 608, 609 and 610 to identify and extract data from the search data file(s) 225 for the other application(s)). The at least one other source may, in some example embodiments, include a service 227 (FIG. 1). The searching of service data 228 associated with a service will be described in greater detail below with reference to FIG. 4. The at least one other source may, in some example embodiments, include a service, application or data stored at a different memory component than the memory component used to store the third party application 226 and/or the search data file 225 for that third party application 226. For example, in some example embodiments, data on a memory module 230 (FIG. 1) may be searched. As will be described in greater detail below with reference to FIGS. 5 and 6, in some example embodiments, data associated with a separate sandbox may be searched.

The at least one other source may also, in at least some example embodiments, include application names. That is, the search application 221 may also search (at 612), the names of third party applications installed on the electronic device 201 to determine whether any of the third party applications have a name that matches the search query.

Figure 6:
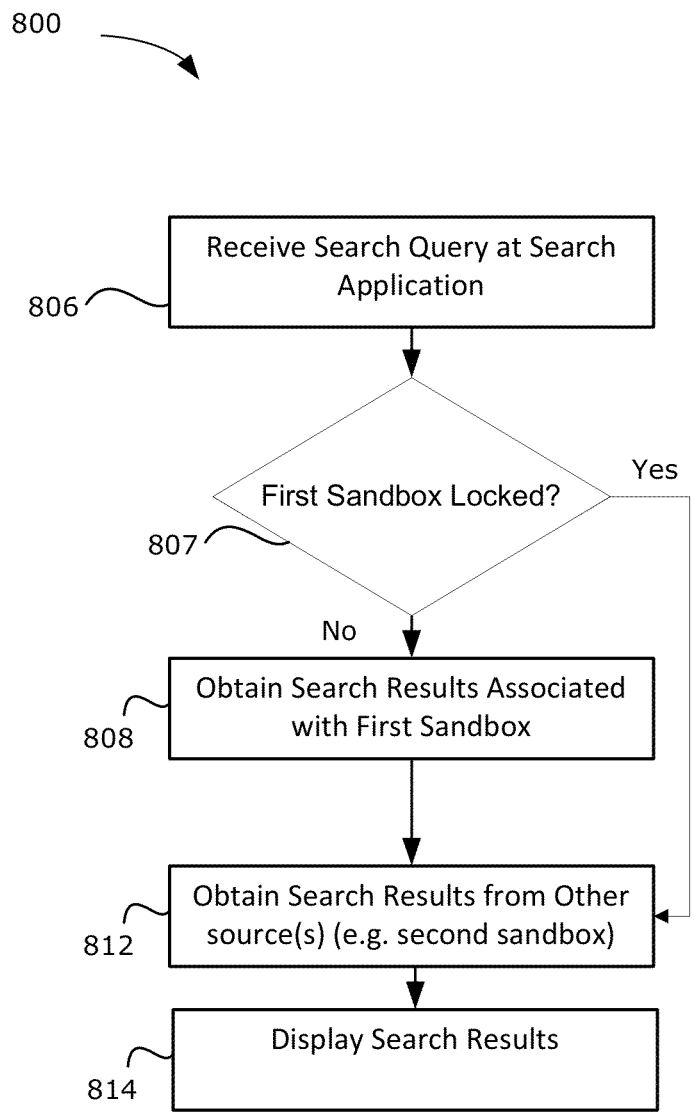
FIG. 6 is a flowchart of a further example method for searching data in accordance with example embodiments of the present disclosure.

At 614, the search application 221 generates a display of search results. The display is generated based on both the information matching the search query (i.e. the information identified at 609) and the associated information (i.e. identified at 610). For example, as noted above, where a field of a record includes content that matches the search query, then that field may be displayed. However, other fields associated with the same record may also be displayed. In some example embodiments, the complete record may be displayed. An example display 900 will be discussed below with reference to FIG. 7. In the example of FIG. 6, a search query of "Hockey" causes a third party application to be searched. Three records are identified since each of those records includes a field containing the search query. However, other fields, such as a date field, are also displayed.

Other associated information that may be used to generate the display may include metadata. The metadata is data that is included in a portion of the search data file 225 that is not searchable. Thus, the term metadata as used herein refers to the unsearchable portion of the search data file 225. The metadata is, in at least some example embodiments, not directly displayed, but it is used to generate the display.

The metadata that is used to generate the display may take different forms in different example embodiments. By way of example, in some example embodiments, the metadata may specify an image path. The image path may be the path of an icon that is to be displayed when a search query matches a field of a particular record. In such cases, at 614, the search application 221 may retrieve the image and include the image along with its associated search result.

By way of further example, in some example embodiments, an unbound uniform resource identifier (URI) may be specified in the metadata. The URI may be used to invoke a given search result. That is, the URI may be used to open the search result in the third party application 226. In such example embodiments, the display may be generated so that a search result may be activated using an input interface (such as a touchscreen display) and the activation will cause the URI to be used to invoke the search result. In at least some example embodiments, if no URI is provided by the third party application 226 and a search result is activated, then the third party application associated with that search result may be invoked. An application switch may be used when the third party application 226 is invoked which directs the third party application 226 to open a specific record. For example, a record identifier associated with the search result which was activated may be used to inform the third party application 226 of the record that is to be opened.

By way of further example, in at least some example embodiments, the metadata may be used to group or order search results. For example, metadata may assign records to one of a plurality of different groups. Multiple records may, in some example embodiments, be assigned to a common group. This group information may be used by the search application 221 to generate the display. For example, in some example embodiments, when multiple records of a common group include content that corresponds to the search query, those records may be displayed together in a common group. Alternatively, in some example embodiments, when multiple records of a common group include content that corresponds to the search query, only a single one of those records may be displayed.

Similarly, metadata may establish the relative priority of records. When the search application 221 displays search results which identify a plurality of records associated with a single third party application 226, the search results may be displayed in an order that is determined by the metadata specifying the relative priorities.

Since the search application 221 provides searching, more than one data source is searched (as was explained with reference to 609 and 612) and thus the display may include the search results associated with more than one data source. More particularly, as noted above, the display may include the search results obtained (at 609) from the search data file 225 and may also include the search results that were obtained from the other source(s) at 612.

Searching of Data Associated with a Service

Figure 4:
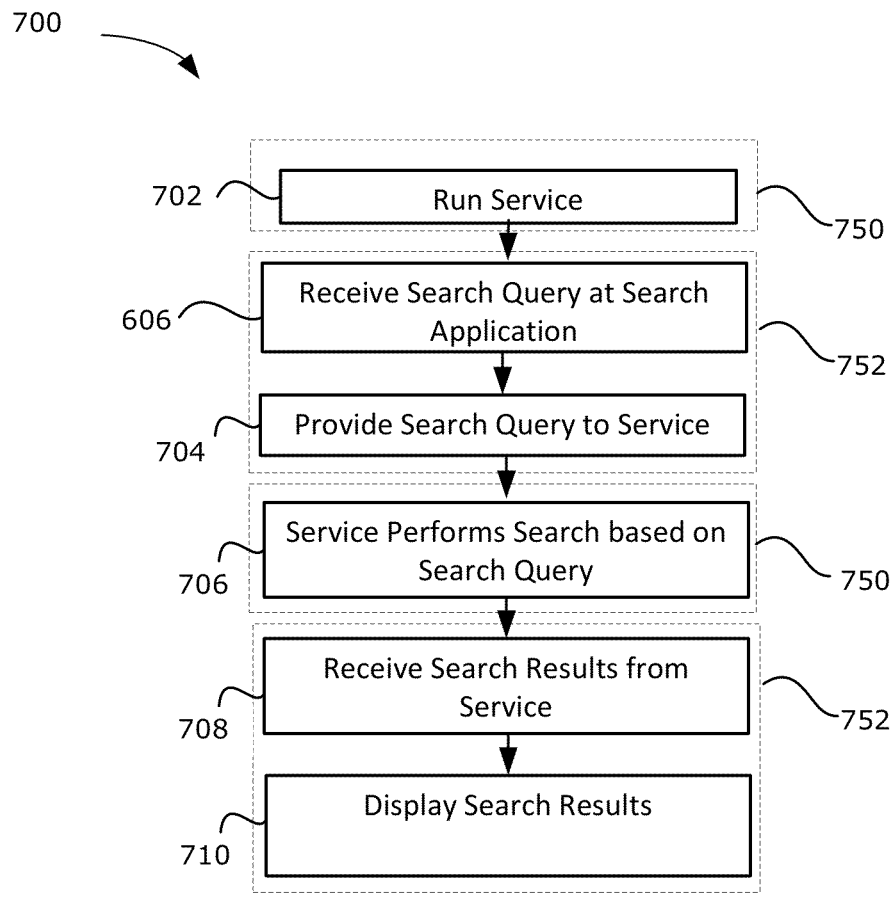
FIG. 4 is a flowchart of a further example method for searching data in accordance with example embodiments of the present disclosure.

Referring now to FIG. 4, a flowchart of a further example method 700 for providing searching of data will now be discussed. The example method 700 may be performed by the electronic device 201 of FIG. 1 (or the electronic device 201 of FIG. 5). More particularly, the processor 240 of the electronic device 201 may be configured to perform the method 700. A memory associated with the processor 240 may include processor-executable instructions which, when executed, cause the processor 240 to perform the method 700 of FIG. 4. In at least some example embodiments, these processor-executable instructions are provided in one or more of the software modules described above with reference to FIG. 1. For example, a service 227, a search application 221 and/or an operating system 222 associated with the electronic device 201 may configure the electronic device 201 to perform the method 700. Since a plurality of different software components may cause the method 700 to be performed, the method 700 may be comprised of a plurality of sub-methods each performed by a different software component.

For example, a portion 750 of the method 700 may be performed by the service 227. That is, the service 227 may be configured to cause the processor 240 to perform a portion 750 of the method 700. This portion 750 may also be considered a method.

Similarly, a portion 752 of the method 700 may be performed by the search application 221. That is, the search application 221 may be configured to cause the processor 240 to perform a portion 752 of the method 700. This portion 752 may also be considered a method.

Thus, FIG. 4 describes a plurality of methods that may be performed. A method is described that may be provided by a service 227 (i.e. the portion 750 of the method 700), and a method is described that may be provided by a search application 221 (i.e. the portion 752 of the method). Additionally, a method 700 may be jointly performed by the search application 221 and the service 227, or by other software applications or modules.

As noted in the discussion of FIG. 1 above, a service differs from an application in that the service 227 is generally configured to run as a background process on the electronic device 201. More particularly, applications typically require some user input (such as selecting an icon associated with the application from a home or start page) in order to cause them to run on the electronic device 201. When the application starts up, it is typically accompanied by an associated graphical user interface and the graphical user interface may remain active while the application runs. In contrast, a service 227 may run without a graphical user interface and/or may not require user input in order to run. The service 227 may be automatically initiated; for example, when the electronic device 201 first boots up.

Thus, at 702 the service 227 is run as a background process on the electronic device. This may be performed automatically when the electronic device 201 is powered on and/or awakened from a locked or sleep state. Since the service 227 is ordinarily running (e.g. as a background process), services may provide search result data to a search application 221 in a manner that differs from the manner by which a third party application provides search results. As noted in the discussion of FIG. 3, applications may specially prepare search data before a search query is received by a search application 221 and the search application 221 may perform the search of this data. In contrast, in some example embodiments, a service 227 may perform the searching of its service data 228 after a search query is received.

More particularly, in the method 700 of FIG. 4, the search query is received at the search application at 606. This feature is described in greater detail with reference to FIG. 3. The search query is received while the service 227 is running as a background process on the electronic device 201. In response to receiving the search query, the search application provides (at 704) the search query to the service 227. That is, the search query is, at 704, passed to the service 227 to allow the service 227 to perform a search based on the search query.

The service 227 performs the search based on the search query (at 706) and provides the results to the search application. These results are received at 708 at the search application. Thus, in response to passing the search query to the service, search results are received from the service. These search results are formatted according to predetermined rules which allow the search application 221 to understand the nature of the search results being provided. For example, the search results may be provided using one or more of the predetermined rules described above with reference to the search data file 225 of FIG. 2. That is, the same rules that are used to format the search data file 225 may be used by the service 227 to format the search results that it provides to the search application 221.

For example, any of the metadata described above with reference to FIG. 2 may be included with the search results that are provided by the service 227 at 752. Accordingly, each search result that is provided by the service 227 to the search application 221 may be associated with specific metadata which may be used by the search application when rendering search results. For example, metadata may specify an image path (of an image that is to be displayed with a search result), a URI for invoking a particular search result, ordering data which may be used by the search application to determine the relative ordering of the search results when they are displayed, and/or grouping information which may be used to group search results. Other types of metadata may be included in at least some example embodiments.

After the search results are received at the search application (at 708), they are displayed by the search application at 710. While the search application performs the rendering of the search results, the service 227 may be permitted to influence or control the manner by which the search results are displayed. For example, as noted above, metadata that is included with the search results may be used for this purpose.

It will be appreciated that the display generated at 710 may include the features of the display generated at 614 of the method 600 of FIG. 3. For example, prior to the display (at 710), the method 700 may include a step of obtaining search results from other sources. Example methods by which search results may be obtained from other sources are described in greater detail above; for example, with reference to 612 of FIG. 3. In such example embodiments, the display generated at 614 may include both the search results from the service 227 and the search results from the at least one other source.

Furthermore, the features 704, 706, 708 of the method 700 of FIG. 4 may be performed, in some example embodiments, together with the features of the method 600 of FIG. 3 which allow for a search data file 225 associated with a third party application 226 to be searched. For example, the features 704, 706, 708 of the method 700 of FIG. 4 may be performed when obtaining other search results from other sources at 612 of the method 600 of FIG. 3.

Further Example Electronic Device

Figure 5:
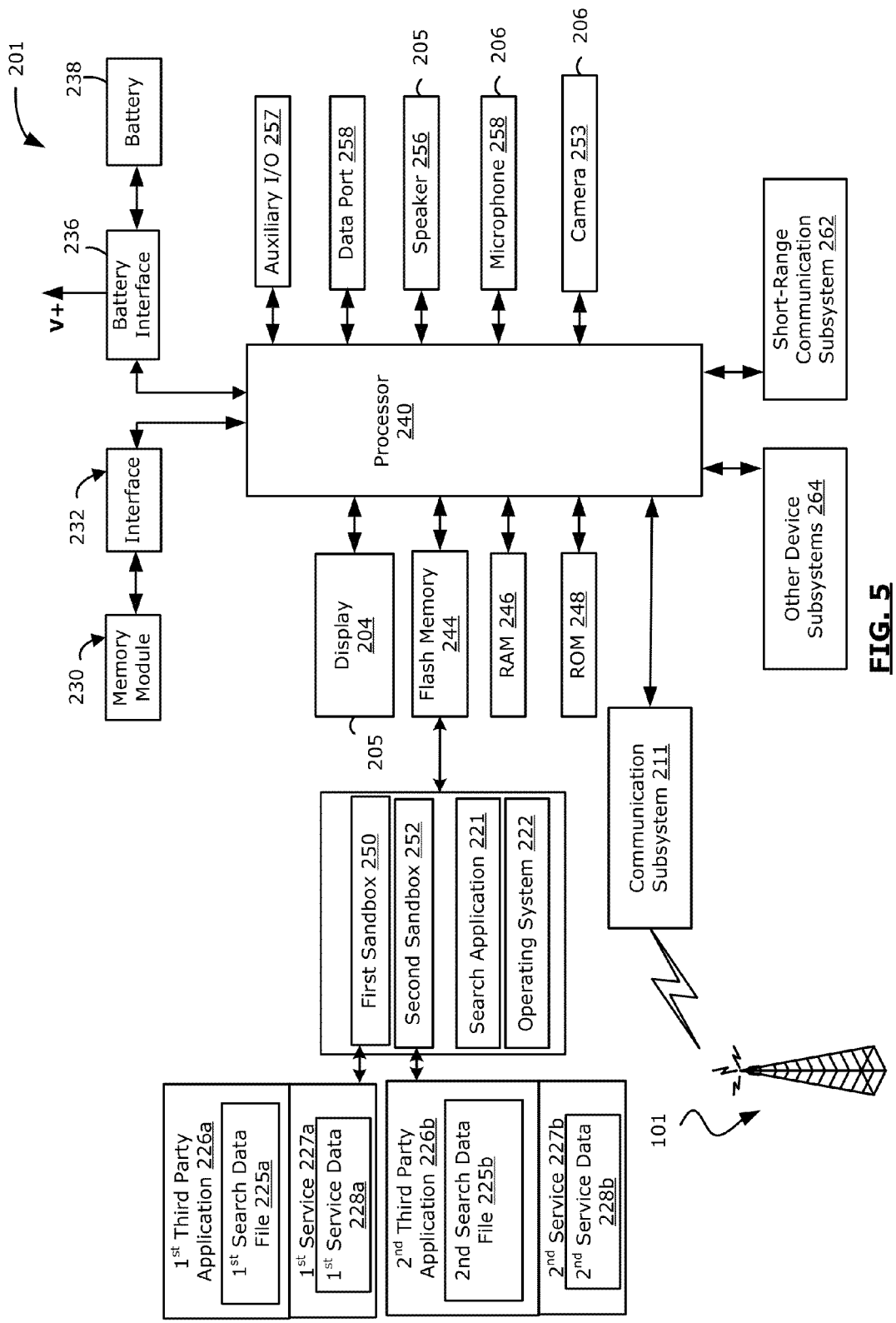
FIG. 5 is a block diagram illustrating another example electronic device in accordance with example embodiments of the present disclosure.

Referring now to FIG. 5, a block diagram of a further example electronic device 201 is illustrated. The electronic device 201 of FIG. 5 may include many features of the electronic device 201 of FIG. 1, and the description of these features will not be repeated but like reference numerals have been used to denote like components.

The example electronic device of FIG. 5 utilizes a sandboxing technique which allows for the separation of data and/or applications into two or more separate operating environments.

In the electronic device 201 of FIG. 5, at least some files and applications that access the files can be classified according to a sandbox 250, 252. A sandbox (also referred to herein as a workspace) can be defined as a workspace, perimeter or environment, in which the files and/or applications are restricted. The workspace can be one of a plurality of partitions. Each workspace is separate from each of the other workspaces such that a tightly-controlled set of resources for controlling entities such as, but not limited to, data files, network connections and hardware and running applications that access the entities provides a security mechanism for separating the launching and running of programs and entities in the different workspaces. Rule sets can be implemented to provide full control over what processes are started, spawned (by other applications), allowed to access entities such as, but not limited to, data files, network connections, and hardware, or allowed to inject code into other applications. Sandboxing provides a security system where data is prevented from movement between the different areas. More specifically, sandboxes 250, 252 (and other components, and software on the electronic device 201) may be configured such that data is prevented from being moved between different sandboxes 250, 252.

The sandboxes 250, 252 generally allow the electronic device 201 to be used in different operational contexts while maintaining file security. For example, the electronic device 201 may be used for both personal use and also for business use in some example embodiments. Business files and applications be kept separately from personal files and application (e.g. business files may be kept in a corporate sandbox and personal files may be kept in a personal sandbox and the sandboxes may be walled off from one another so that file transfers between the sandboxes are prevented or controlled). Thus, the sandboxes 250, 252 may be considered to be secure and lockable file systems, in at least some example embodiments.

Accordingly, in at least some example embodiments, there can be multiple modes or workspaces provided by the electronic device 201. An application running in one sandbox 250, 252 can access entities such as, but not limited to, data files, network connections, and hardware in the sandbox 250, 252 in which it is running, but can be restricted from accessing and operating on entities such as, but not limited to, data files, network connections, and hardware in another sandbox.

For example, the system may be partitioned into two workspaces (as secure workspaces, i.e., sandboxes) such as a corporate sandbox and a personal sandbox. The data and files in the corporate sandbox can be strictly separated from applications or programs running the personal sandbox. This secure separation provides a security mechanism that allows a system to operate in the numerous modes. The establishment of a secure separation to provide a security mechanism that allows a system to operate in numerous modes is not limited to two sandboxes and can be implemented for three or more sandboxes.

In FIG. 5, the memory is illustrated as being partitioned into a plurality of sandboxes 250, 252. In the example embodiment illustrated, the memory is partitioned into a first sandbox 250 and a second sandbox 252. Each sandbox 250, 252 may be associated with separate data and/or applications. For example, in the example illustrated, the first sandbox 250 is associated with a first third party application 226a, which may be associated with a first search data file 225a (which may be of the type described with reference to FIG. 2) and the second sandbox 252 is associated with a second third party application 226b, which may be associated with a second search data file 225b (which may also be of the type described with reference to FIG. 2).

Similarly, in some example embodiments, one or more services may be provided within a sandbox. For example, a first service 227a associated with first service data 228a may be provided in a first sandbox 250 and a second service 227b associated with second service data 228b may be provided in the second sandbox 252.

In at least some example embodiments, one or more highly trusted applications (or services) may act as hybrid applications (or services). A hybrid application is a trusted application that is capable of and permitted to concurrently access files from more than one sandbox 250, 252. That is, the hybrid application is permitted to access data from a plurality of sandboxes 250, 252 within a single instance of the hybrid application. The ability to access files from a plurality of sandboxes 250, 252 at the same time may be provided to the hybrid application by higher-level system components, such as a sandbox management application or module (not shown) which manages the sandboxes 250, 252 and administers a set of access rules for the sandboxes. The sandbox management application or module may, for example, be provided by the operating system 222.

In at least some example embodiments, the search application 221 is a hybrid application. That is, the search application is configured to access data within the first sandbox 250 and also data within the second sandbox 252. For example, the hybrid search application is configured to access a first search data file 225a from a first sandbox 250 and to also access a second search data file 225b from a second sandbox 252.

In at least some example embodiments, one or more of the sandboxes may be lockable (e.g. the first sandbox 250 may be a work/corporate sandbox which is lockable). That is, one or more of the sandboxes may be locked so that applications and data associated with that sandbox are not accessible until the sandbox is unlocked. Such locking may provide an additional level of security to the electronic device 201. For example, an electronic device 201 having corporate data stored within a corporate sandbox may be used by someone who is not authorized to view or access the corporate data. More particularly, the corporate sandbox could be locked and the unauthorized person may be permitted to utilize the electronic device 201 while only a personal sandbox is unlocked and available.

Search with Sandboxing

Referring now to FIG. 6, an example method 800 is illustrated. The method 800 may be used to provide searching in an environment in which sandboxes of the type described with reference to FIG. 5 are used.

The example method 800 may be performed by the electronic device 201 of FIG. 5. More particularly, the processor 240 of the electronic device 201 may be configured to perform the method 800. More particularly, a memory associated with the processor 240 may include processor-executable instructions which, when executed, cause the processor 240 to perform the method 800 of FIG. 6. In at least some example embodiments, these processor-executable instructions are provided in one or more of the software modules described above with reference to FIG. 1 (and also illustrated in the electronic device 201 of FIG. 5). For example, in at least some example embodiments, the search application 221 may include instructions which configure the processor to perform the method 800 of FIG. 6.

At 806, a search query is received at the search application 221. The search query may be received in the manner described above with reference to 606 of FIG. 3. The search application is a hybrid application that is configured to access data within a first sandbox and data within a second sandbox. The first sandbox 250 is lockable.

In response to receiving the search query, the search application may (at 807), determine whether the first sandbox 250 is locked.

If the sandbox is locked, then search results associated with the first sandbox are not obtained. For example, in example embodiments in which data associated with a third party application is being searched in the manner described with reference to FIG. 3, then the search is not performed on a first search data file 225a (FIG. 5) which is associated with a first third party application 226a that is associated with the first sandbox 250. Similarly, the search may not be performed on service data 228a associated with a service 227a on the first sandbox 250. That is, either a search query is not passed to the service 227a (in the manner described with reference to 704 of FIG. 4), or the search query may be passed but the service 227a does not return search results since it determines that it is associated with a locked sandbox.

Instead, the method 800 may proceed to 812 where search results from another source are obtained (for example, applications or services associated with the second sandbox may be searched, assuming the second sandbox is not in a locked state or is not lockable).

If, however, it is determined that the first sandbox is not locked, then the method may proceed to 808 where search results associated with the first sandbox are obtained. For example, if the first sandbox is unlocked, search results may be obtained from one or more applications associated with the first sandbox 250. For example, the steps 608, 609, and/or 610 of the method 600 of FIG. 3 may be used to identify a first search data file 225a for a third party application 226a associated with the first sandbox 250 and to extract search results associated with the search query from the identified file.

Irrespective of whether the first sandbox is locked, search results from the second sandbox 252 may be obtained (at 812) (unless, for example, the second sandbox is locked). For example, search results may be obtained from a second search data file 225b prepared by a second third party application 226b associated with the second sandbox 252.

At 814, the search results are displayed. For example, if the first sandbox was not locked and search results were obtained from both the first sandbox and the second sandbox, search results from the first sandbox may be displayed together with search results from the second sandbox. For example, search results that were obtained from applications (such as the first third party application 226a) associated with the first sandbox 250 are displayed together with search results for applications (such as the second third party application 226b) associated with the second sandbox 252.

The display provided at 814 may include features described above with reference to the display features of the method 600 of FIG. 3 (which are described with reference to 614) and/or the display features of the method 700 of FIG. 4 (which are described with reference to 710). Furthermore, the display may include the features described below with reference to the example display 900 of FIG. 7.

In some example embodiments, the display generated at 814 may include one or more indicators to distinguish search results associated with the first sandbox 250 from search results associated with the second sandbox 252. For example, a briefcase icon or an icon of another type may be displayed adjacent to search results associated with a first sandbox 250 (which may be a corporate sandbox) and another icon or no icon may be displayed adjacent to search results associated with the second sandbox 252.

In some example embodiments, an application associated with the first sandbox 250 may have an equivalent application operating within the second sandbox 252. For example, in some example embodiments, each sandbox 250, 252 may have its own web browser. Each of these applications may have their own data. For example, a first third party application 226a and a second third party application 226b may be equivalents (i.e. the same application operating in different sandboxes), but the first third party application 226a associated with the first sandbox 250 and the second search data file 225b have separate search data files 225a, 225b. Thus separate search results may be generated for each of these applications. However, in at least some example embodiments, the search application is configured to identify such equivalent applications and to merge the search results from equivalent applications (that may be associated with separate sandboxes) when generating a display. For example, using the web browser example noted above, a single web browser set of search results 902 (FIG. 7) may be displayed which lists the results from both web browsers together but the display may include one or more indicators 905 (FIG. 7) to identify the source of the data (i.e. whether the search results is associated with the first sandbox 250 or the second sandbox 252).

Example Display

Figure 7:
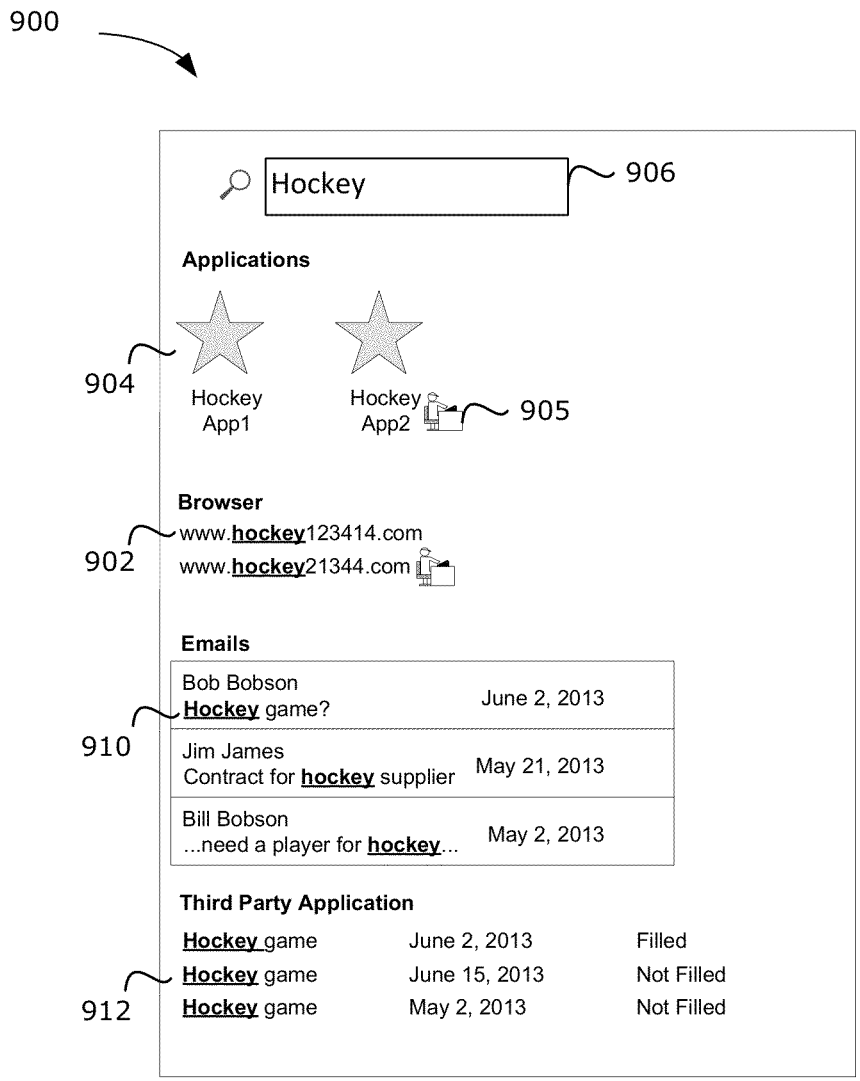
FIG. 7 is an example display screen in accordance with example embodiments of the present disclosure.

An example display 900 will now be described with reference to FIG. 7. The example display 900 (or a variant thereof) may be generated and/or displayed during any one or more of the "display search results" step(s) 614, 710, 814 of FIGS. 3, 4 and 6.

The display 900 may include a search input field 906, which is a text input field in which a search query may be input. In the example, the search query is "Hockey."

The display 900 may include search results associated with a plurality of applications, services, and/or files. For example, the display 900 includes application name search results 904. The application name search results 904 section lists applications associated with the electronic device 201 having a name that matches the search query. These applications may, in some example embodiments be associated with a plurality of sandboxes 250, 252. In some such example embodiments, an indicator 905 may be used to indicate the sandbox which is associated with the application.

In the example, web browser search results 902 are included. The web browser search results 902 illustrate an example of how search results may be displayed when equivalent applications are provided on the device. More particularly, equivalent applications may be provided within multiple sandboxes (e.g. a web browser may be provided on both a first sandbox and a second sandbox). As noted in the discussion of FIG. 6 above, in such example embodiments, the search application may merge the search results from these equivalent applications, but may include an indicator 905 of the source of a search result.

It will be appreciated that similar techniques may be used to distinguish between search results associated with different memory components. For example, search results for data stored on a removable memory module may be merged with search results from data store on internal memory. In some such example embodiments, an indicator may be used to identify whether a particular search result is associated with removable memory or internal memory.

The display 900 includes a service search results 910 section. The service search results 910 section displays search results associated with a service 227. In the example, the service is an email service and the search results are emails. These search results may, in at least some example embodiments, be obtained in the manner described above with reference to FIG. 4.

The display 900 further includes a third party application search results 912 section. This section provides search results that are associated with a third party application. These search results may, in at least some example embodiments, be obtained in the manner described above with reference to FIG. 3.

As noted in the discussion of FIG. 3 above, the third party application search results 912 section may include information from a field which matches the search and may also include information from other related fields. For example, a date field is included even though the date does not correspond with the search query.

Metadata may be used to group and/or order the search results in the third party application search results 912 section. For example, in the example illustrated metadata may specify that the hockey games that already have enough players (i.e. are "filled") are to be grouped together. This grouping, established by the third party application associated with the search results overrides other default ordering that might appear to be otherwise natural. For example, the grouping provided in the metadata may take precedence over alphabetical or chronological ordering.

While the present application is primarily described in terms of methods, a person of ordinary skill in the art will understand that the present application is also directed to various apparatus such as an electronic device 201 including a mobile communications device. The electronic device 201 includes components for performing at least some of the aspects and features of the described methods, which may be by way of hardware components (such as the memory 244 and/or the processor 240), software or any combination of the two, or in any other manner. Moreover, an article of manufacture for use with the apparatus, such as a pre-recorded storage device or other similar computer readable storage medium including program instructions recorded thereon, or a computer data signal carrying computer readable program instructions may direct an apparatus to facilitate the practice of the described methods. For example, a compute readable storage medium may include computer executable instructions for performing one or more of the methods described herein. It is understood that such apparatus and articles of manufacture also come within the scope of the present application.

The term "computer readable medium" or "computer readable storage medium" as used herein means any medium which can store instructions for use by or execution by a computer or other computing device including but not limited to, a portable computer diskette, a hard disk drive (HDD), a random access memory (RAM), a read-only memory (ROM), an erasable programmable-read-only memory (EPROM) or flash memory, an optical disc such as a Compact Disc (CD), Digital Versatile Disc (DVD) or Blu-ray™ Disc, and a solid state storage device (e.g., NAND flash or synchronous dynamic RAM (SDRAM)).

Example embodiments of the present application are not limited to any particular operating system, system architecture, mobile device architecture, server architecture, or computer programming language.

The various example embodiments presented above are merely examples. Variations of the innovations described herein will be apparent to persons of ordinary skill in the art, such variations being within the intended scope of the present application. In particular, features from one or more of the above-described example embodiments may be selected to create alternative example embodiments including a sub-combination of features which may not be explicitly described above. In addition, features from one or more of the above-described example embodiments may be selected and combined to create alternative example embodiments including a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

The invention claimed is:

1. A processor-implemented method of searching of data associated with an electronic device, comprising:
   receiving a search query;
   identifying a search data file associated with a third party application, the search data file being prepared according to predetermined format rules by the third party application, and stored at a location of memory of the electronic device;
   searching at least a portion of the search data file using the search query to identify information that matches the search query;
   using the predetermined format rules to identify associated information in the search data file that is related to the information that matches the search query;
   obtaining search results from at least one other source; and
   displaying, at a first section of a display, third party application search results based on the information matching the search query and the associated information, the display including, at a second section of the display, the search results from the at least one other source.

2. The method of claim 1, wherein the predetermined format rules allow a record having a plurality of fields to be established within the search data file, and wherein the information matching the search query is contained in a first field of the record, and wherein identifying associated information comprises identifying a second field in the record that includes the first field, and wherein the second field does not, itself, correspond to the search query and wherein the display includes both the contents of the first field and the contents of the second field.

3. The method of claim 2, wherein the predetermined format rules includes data in a table and wherein rows of the table are used to establish records, such that all data in a given row is associated with a common record and different columns denote different fields.

4. The method of claim 1, wherein searching at least a portion of the search data file comprises performing a search on a first portion of the search data file which is configured to be searchable and excluding, from the search, a second portion of the search data file which includes metadata regarding the first portion of the search data file, and wherein the associated information is the metadata.

5. The method of claim 4, wherein the search data file includes an association between specific metadata in the second portion of the search data file and specific data in the first portion of the search data file and wherein identifying the associated information in the search data file comprises retrieving the specific metadata that is associated with the information in the search data file that matches the search query.

6. The method of claim 4, wherein the first portion of the search data file is a first table and the second portion of the search data file is a second table and wherein data of the first table is related with metadata in the second table by row number or column number.

7. The method of claim 4, wherein displaying search results based on both the information matching the search query and the associated information comprises:
   ordering the information matching the search query based on the metadata.

8. The method of claim 1, wherein the third party application is not running on the electronic device during the period of time between when the search query is received and the search results are displayed.

9. The method of claim 1, wherein the at least one other source is a search data file associated with another third party application.

10. The method of claim 1, wherein the third party application has read and write privileges for the search data file and wherein a search application that performs the searching has read-only privileges from the search data file and wherein other applications do not have read or write privileges for the search data file.

11. The method of claim 1, wherein identifying the search data file comprises:
    locating a folder containing the search data file by utilizing a predetermined relative path, the predetermined relative path being a relative locator that is the same for a plurality of third party applications.

12. The method of claim 1, wherein the at least one other source is a service running as a background process on the electronic device at the time that the search query is received, the method further comprising, after receiving the search query:
    passing the search query to the service; and
    in response to passing the search query to the service, receiving search results from the service.

13. The method of claim 1, wherein the search application is a hybrid application that is configured to access data within a first sandbox and data within a second sandbox and wherein the third party application is associated with the first sandbox, the first sandbox being lockable, the method further comprising:
    determining that the first sandbox is not locked.

14. The method of claim 13, wherein the at least one other source is associated with the second sandbox and wherein the display includes one or more indicators to distinguish search results associated with the first sandbox from search results associated with the second sandbox.

15. An electronic device comprising:
    a memory storing a search data file associated with a third party application, the search data file being prepared according to predetermined format rules by the third party application a processor in communication with the memory, and configured to:
receive a search query;
identify the search data file associated with the third party application;
search at least a portion of the search data file using the search query to identify information that matches the search query;
use the predetermined format rules to identify associated information in the search data file, the associated information being related to the information that matches the search query;
obtain search results from at least one other source; and
display, at a first section of a display, third party application search results based on the information matching the search query and the associated information, the display including, at a second section of the display, the search results from the at least one other source.

16. The electronic device of claim 15, wherein the predetermined format rules allow a record having a plurality of fields to be established within the search data file, and wherein the information matching the search query is contained in a first field of the record, and wherein identifying associated information comprises identifying a second field in the record that includes the first field, and wherein the second field does not, itself, correspond to the search query and wherein the display includes both the contents of the first field and the contents of the second field.

17. The electronic device of claim 15, wherein the predetermined format rules includes data in a table and wherein rows of the table are used to establish records, such that all data in a given row is associated with a common record and different columns denote different fields.

18. The electronic device of claim 15, wherein searching at least a portion of the search data file comprises performing a search on a first portion of the search data file which is configured to be searchable and excluding, from the search, a second portion of the search data file which includes metadata regarding the first portion of the search data file, and wherein the associated information is the metadata.

19. The electronic device of claim 18, wherein the search data file includes an association between specific metadata in the second portion of the search data file and specific data in the first portion of the search data file and wherein identifying the associated information in the search data file comprises retrieving the specific metadata that is associated with the information in the search data file that matches the search query.

20. A processor-implemented method of searching data associated with an electronic device, comprising:
determining whether a first sandbox is locked;
if the first sandbox is unlocked, obtaining search results from an application associated with the first sandbox;
obtaining search results from an application associated with a second sandbox; and
displaying the search results from the applications associated with the first sandbox and the second sandbox.

* * * * *